M. C. SCHOCK.
RAPID FLOUR SIFTER.
APPLICATION FILED OCT. 3, 1912.
1,075,946.
Patented Oct. 14, 1913.
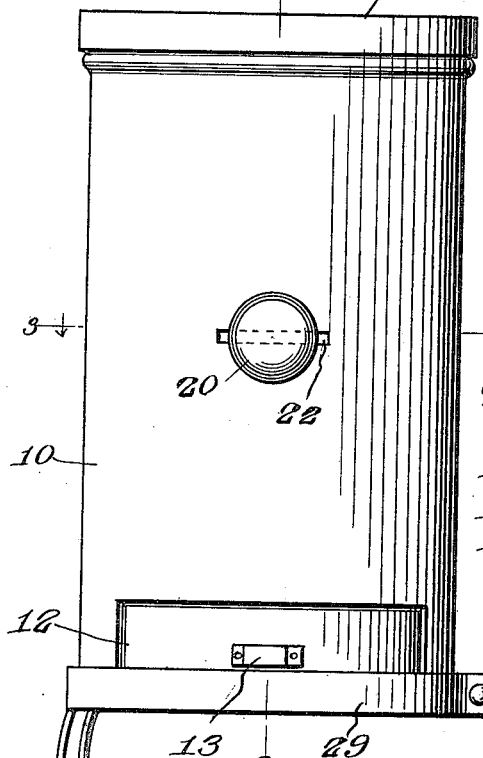
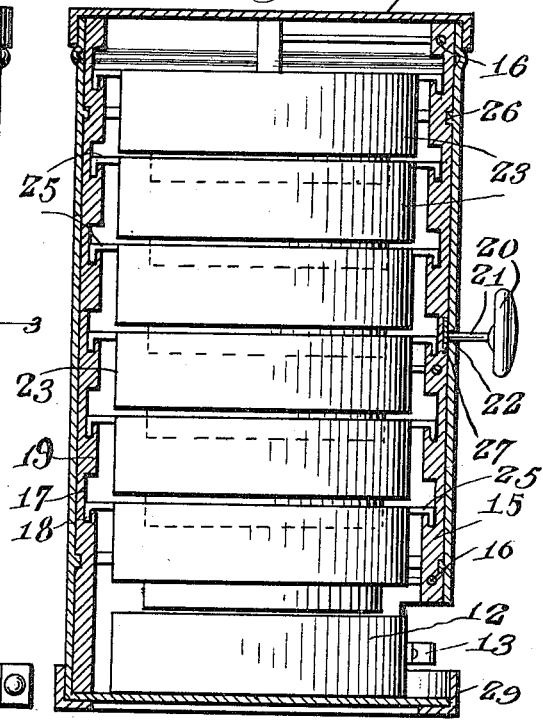
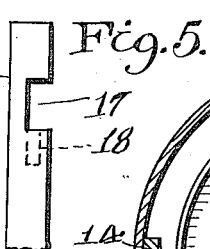
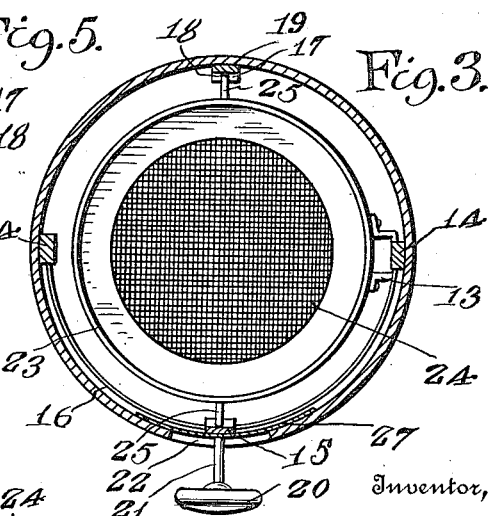
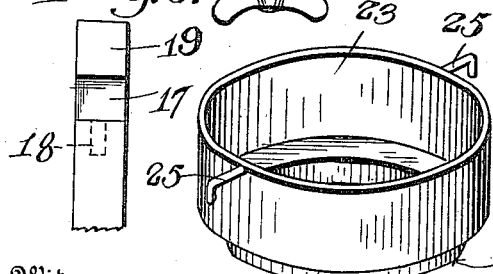
Inventor,
Margaret C. Schock.
By
Attorneys
Witnesses:

UNITED STATES PATENT OFFICE.

MARGARET C. SCHOCK, OF WAUKESHA, WISCONSIN.

RAPID FLOUR-SIFTER.

1,075,946.  Specification of Letters Patent.  Patented Oct. 14, 1913.

Application filed October 3, 1912. Serial No. 723,798.

*To all whom it may concern:*

Be it known that I, MARGARET C. SCHOCK, a citizen of the United States, residing at Waukesha, in the county of Waukesha, State of Wisconsin, have invented certain new and useful Improvements in Rapid Flour-Sifters; and I do hereby declare the following to be a full, clear, and exact description of the invention, such as will enable others skilled in the art to which it appertains to make and use the same.

This invention has special reference to flour sifters and the essential object of the invention is evolved in the provision of a sifter having a plurality of simultaneously agitated sieves whereby the sifting of the flour can be accomplished in a better manner and in less time than is required by single agitator sieves.

The invention consists more particularly in a rapid flour sifter having a plurality of sieves fitting one within the other and supported in a novel manner within a receptacle to be pivoted on certain ends from a single handle or grip, the sieves being so disposed as to permit the use of a greater or less movement of sieves as desired, while a removable tray is provided for catching the sifted flour.

With the above and other objects in view, the invention consists of certain combinations and arrangements of parts, as will be hereinafter more fully described, claimed and illustrated in the accompanying drawings, in which:

Figure 1 is a side elevation of a sieve constructed in accordance with the invention. Fig. 2 is a vertical sectional view thereof with the sieves in elevation. Fig. 3 is a horizontal sectional view taken on the line 3—3 of Fig. 1. Fig. 4 is a detail perspective view of one of the sieves removed. Fig. 5 is a side elevation of a fragmentary portion of one of the supports for the sieves. Fig. 6 is a front elevation thereof.

As shown, my improved sifter embodies an outer receptacle 10 of cylindrical form which has an upper end closed by a top 11 and which at its bottom supports a removable circular tray 12 for catching the sifted flour and which can be readily removed and replaced through the medium of a handle 13.

Arranged vertically within the receptacle and secured rigidly to diametrically opposite points are standards 14, the same being connected to a standard 15, which is slidably mounted between the standards 14, by horizontal connecting wires 16. The standard 15 is provided with a plurality of spaced notches 17 having centrally depending bearing recesses 18 communicating therewith while the inner faces of the recesses are in line with the rear walls of the notches and the forward faces thereof spaced from the inner or forward face of the standard 15.

A movable standard 19 is arranged in contact with the inner face of the receptacle at a point diametrically opposite the standard 15 and is provided with similar notches and recesses while a handle or hand grip 20 disposed outwardly of the receptacle has its shank portion 21 detachably connected to the standard 19 and being movable through a horizontal slot 22 approximately centrally of the height of the receptacle.

A plurality of sieves embodying circular metallic sections 23 are provided, the same having reduced and centrally depending reticulated bottoms 24 extending into the sieve casing therebeneath and also provided with oppositely extending or diametrically disposed supporting arms 25 having depending extremities engageable in the notches and recesses thereof of the opposed standards 15 and 19. When the sieves are thus mounted, the flour is emptied into the upper sieve and by agitating all of the sieves simultaneously by shifting the handle 20 from left to right, the flour may be quickly and thoroughly sifted. It is also obvious that any number of the sieves may be employed as desired while the sifted flour caught within the tray 12 may be removed when full.

The inner face of the receptacle is provided with guide ribs 26 which serve to engage grooves in the movable standards to hold the same in a vertical position and prevent binding, while a plate 27 is secured over the slot 22 and to the shank 21 of the handle to prevent the escape of the materials sifted, through the slot. A clamp 28 is also provided to engage a table or support for holding the sifter rigid during its operation and includes a clamping ring 29 engaging around the base of the receptacle. By loosening this clamping ring 29, the receptacle may be tilted therein or removed therefrom, so that the tray 12 may be removed and replaced.

I claim:

1. In a flour sifter, a receptacle, a catch tray in the bottom of the receptacle, a plurality of sieves having lateral and depending arms, and means movable within the receptacle for receiving the depending elements of said arms and permitting the sieves to be moved therewith.

2. In a flour sifter, a receptacle, a catch tray in the bottom of the receptacle, a plurality of sieves having opposite supporting arms thereon, standards within the receptacle provided with recesses for receiving said extensions and permitting them to be moved therewith, and a handle for moving said standards and thereby simultaneously agitating the sieves.

3. A sifter consisting of a receptacle, vertical supporting members secured within the receptacle and adapted for horizontal oscillatory movement therein, a series of sieves removably secured to said vertical supporting members, and means engaged with one of said supporting members for oscillating the same and thereby oscillating all of the sieves and the other supporting member simultaneously.

In testimony whereof, I affix my signature, in the presence of two witnesses.

MARGARET C. SCHOCK.

Witnesses:
C. H. JACOB,
E. W. JUNEMANN.

Copies of this patent may be obtained for five cents each, by addressing the "Commissioner of Patents. Washington, D. C."